United States Patent [19]

Sherman

[11] 3,887,960
[45] June 10, 1975

[54] SHAFT BUSHING TO PREVENT SOIL MIGRATION

[75] Inventor: George R. Sherman, Louisville, Ky.

[73] Assignee: General Electric Company, Louisville, Ky.

[22] Filed: Feb. 1, 1974

[21] Appl. No.: 438,758

[52] U.S. Cl. .............................. 16/2; 174/152 G
[51] Int. Cl. ..................... B65d 7/48; H01b 17/26
[58] Field of Search ........ 16/2, 108; 174/83, 152 G; 308/237 R, 237 A, 238

[56] References Cited
UNITED STATES PATENTS

| | | | |
|---|---|---|---|
| 2,717,792 | 9/1955 | Pelley | 16/2 |
| 3,091,795 | 6/1963 | Budwig | 16/2 |
| 3,200,694 | 8/1965 | Rapata | 16/2 |

Primary Examiner—Patrick D. Lawson

[57] ABSTRACT

The shaft of a control device is adapted to extend through an oversized opening in a cover plate, and misalignment may occur. A shaft bushing of the present invention is mounted on the shaft so as to substantially seal the opening and prevent the migration of soil through the opening, regardless of the misalignment. The bushing is a two-part bushing which is assembled from the opposite sides of the cover plate through the said opening, and the two parts interlock into a unitary structure to seal the opening.

2 Claims, 3 Drawing Figures

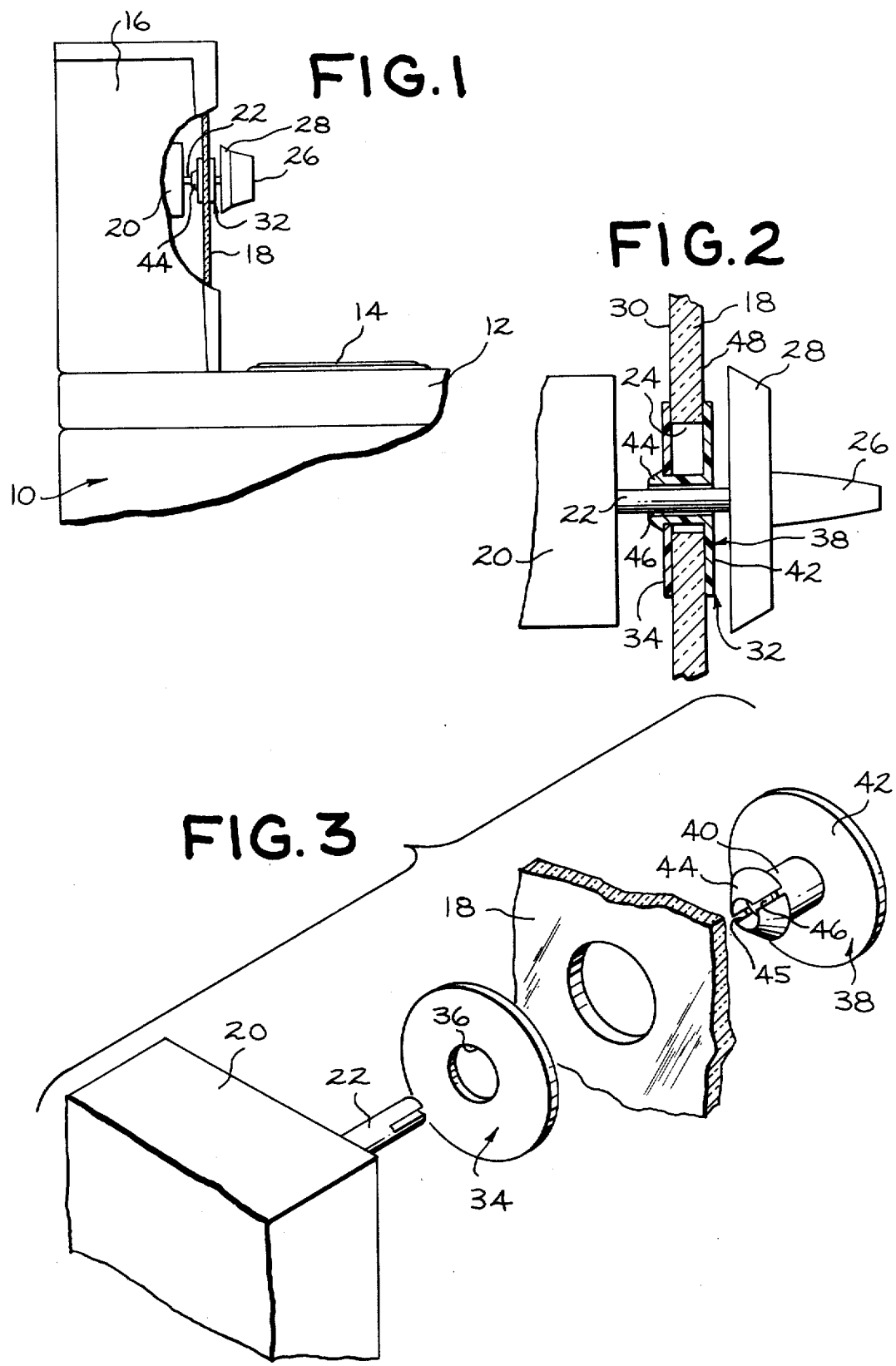

SHAFT BUSHING TO PREVENT SOIL MIGRATION

BACKGROUND OF THE INVENTION

The present invention has general utility as a bushing design that is adapted to be mounted on a shaft and located within an opening through which the shaft extends so as to substantially seal or plug the opening and prevent the migration of soil therethrough.

One use for the present invention is in the backsplash or control panel of a kitchen appliance such as a domestic range, whether it be gas or electric. Behind such a control panel would be mounted a plurality of control devices each having a shaft that extends through an opening in a cover plate or glass panel. Such control devices would be mounted from the back side of the glass panel and their shafts would extend through the panel for receiving a control knob for manual manipulation of the control device. Each opening in the control panel is usually made oversized to be larger than the diameter of the shaft passing through the opening to allow for tolerance build-up throughout the backsplash which might cause a misalignment of the shaft with the opening. Hence, under all conditions, the shafts would not be in a position to rub against the sides of the openings and cause binding or other difficulty of operation.

One disadvantage of having oversized openings for receiving the shafts of the control devices is that dust, moisture, food soil and grease spatter might tend to collect on the back side of the glass panel and become unsightly, as well as difficult to reach and remove; without perhaps, having to call a product service technician to disassemble the control panel.

The principal object of the present invention is to provide a shaft with a split bushing that is capable of sealing an opening in a paanel through which the shaft extends, even when the shaft may be off-center of the opening.

A further object of the present invention is to provide a two-piece interlocking bushing of the class described that is supportable on a shaft for preventing the migration of soil around the shaft.

SUMMARY OF THE INVENTION

The present invention, in accordance with one form thereof, relates to a control device having a shaft that extends through an opening in a thin cover plate. A two-piece, spool-like bushing is adapted to be mounted on the shaft and disposed within the opening so as to be able to seal the opening even though the shaft might be off-center of the opening. The two pieces of the bushing have mating parts so that they may snap together and form a close fit with the edges of the opening in the cover plate.

BRIEF DESCRIPTION OF THE DRAWINGS

This invention will be better understood from the following description taken in conjunction with the accompanying drawings and its scope will be pointed out in the appended claims.

FIG. 1 is a fragmentary, side elevational view of a kitchen appliance such as an electric range having a backsplash along the rear edge of a cooktop of the range where the backsplash includes a front control panel behind which a control device is mounted. The control device has a shaft which extends through an opening in the control panel, and the shaft supports a knob on the free end thereof for ease of manual manipulation.

FIG. 2 is an enlarged cross-sectional view showing the control panel of FIG. 1 behind which is mounted the control device with a shaft that extends through an opening in the control panel. Located within this opening is the shaft bushing of the present invention.

FIG. 3 is a still enlarged fragmentary exploded view of a control device of the previous figures where the shaft bushing is shown in two parts, one part being a washer-like member at one side of the control panel and the other part being a spool-like member having a tubular portion and a flange portion at one end of the tube where the flange corresponds to the washer-like member so that the resulting structure when interlocked as shown in FIG. 2 will constitute a spool-like member.

DESCRIPTION OF THE PREFERRED EMBODIMENT

Turning now to a consideration of the drawings, and in particular to FIG. 1, there is shown a portion of the side of an electric range 10 having a horizontal cooktop 12 at generally counter height, and in which is mounted a surface heating unit 14. Arranged along the back side of the cooktop 12 is a backsplash 16 which extends for nearly the entire width of the cooktop. This backsplash has a generally hollow housing with a front wall 18 which may either be a metal cover plate or a glass crystal. Mounted within the backsplash 16 is shown a control device 20 such as a multiple selector switch. This switch has a shaft 22 which is adapted to extend through an opening 24 in the crystal 18, as is best seen in FIG. 2. This opening 24 is an oversized circular opening which is able to accommodate misalignment of the shaft 22 in the opening so as to take care of tolerance build-up between the various parts. This tolerance build-up may occur because the parts are usually made on high speed, automatic equipment and designed to be used with quick assembly methods. The openings 24 in the crystal 18 can be rather accurately positioned, but it frequently happens that the means for mounting the control device 20 allows for a certain amount of give and take so that they may be off one-eighth inch or one-fourth inch in the overall width of the backsplash.

As mentioned earlier, these glass crystals 18 are usually not readily removable. While it is true that the free end of the shaft 22 is usually furnished with a knob 26 with a large skirt 28 that generally hides the opening 24, it is also true that the usual shaft is not hermetically sealed with respect to the crystals. Hence, dust, condensation, food soil and grease spatters may migrate through the opening 24 and collect on the inner surface 30 of the crystal 18 such that they would always be visible to the user of the range and be an eyesore.

The present invention relates to a shaft bushing 32 which is a two-piece plastic bushing that is adapted to slip onto the shaft 22 and lodge within the opening 24 of the crystal 18 and thereby seal the opening against the migration of soil therethrough. The general nature of the bushing 32 may best be seen in the exploded view of FIG. 3. This bushing has a first member 34 in the form of a thin washer having an enlarged central bore 36. This washer 34 is adapted to fit loosely over the shaft 22 before the shaft 22 is inserted through the opening 24 in the crystal 18. The second part of the shaft bushing 32 is a spool-like member 38 having a tubular portion 40 with a flange 42 at one end and a tapered formation 44 at the other end that is split at several places 45 to give it transverse resilience. The tubular portion 40 is, of course, hollow having a bore 46 that is adapted to slip closely over the shaft 22. The bore 36 in the washer-like member 34 is an oversized bore such that the split tapered formation 44 of the spool 38 is adapted to be compressed and snap through the bore 36 and become lodged therein as is best seen in FIG. 2. When this interlocking takes place, then the overall configuration of the bushing 32 is that of a spool having enlarged flanges 34 and 42, as is best seen in FIG. 2. The advantage of this is that it is possible for the shaft 22 to be off-center and the flanges 34 and 42 are able to accommodate this and slide with respect to the inner surface 30 of the crystal 18 and the outer surface 48 of the crystal. Thus, the shaft bushing 32 in effect serves as a plug or sealing means to close off the opening 24 in the crystal 18 and maintain the inner surface 30 of the crystal clean from dust, condensation, food soil or grease spatter that may otherwise accumulate on that surface. Thus, it will be understood that this bushing is a floating or adjustable bushing that is capable of shifting depending upon the conditions so as to seal the opening 24.

Modifications of this invention will occur to those skilled in this art. Therefore, it is to be understood that this invention is not limited to the particular embodiment disclosed but that it is intended to cover all such modifications which are within the true spirit and scope of this invention as claimed.

I claim:

1. A rigid supporting panel having a shaft bushing adjustably mounted in an oversized opening in the panel, said bushing comprising a first member that is larger than the said opening and has an oversized central bore adapted to slip freely over a shaft, said shaft being adapted to be inserted through the said panel opening, and a second interlocking member also being larger than the said panel opening and having a central bore adapted to slip closely over the said shaft, said second member having fastening means engagable in the said oversized bore of the first member and held therewith so that the said opening in the supporting panel is substantially closed by the combined shaft and bushing which extend through the said opening, said bushing being loosely fitted within the said oversized panel opening so as to be capable of lateral adjustment within the plane of the said opening.

2. A supporting panel and shaft bushing as recited in claim 1 wherein the said first member is a washer-like member and the second interlocking member is a spool-like member having a tubular portion which is adapted to fit over a shaft and a flange portion at one end of the tube which corresponds to the said washer-like member, said tubular portion having a resilient tapered formation at the end opposite the said flange, said tapered portion being adapted to slip through the said oversized central bore in the first member and become locked therewith to form a complete spool member.

* * * * *